July 16, 1968     E. HARNEST     3,392,665

ROASTING SUPPORT FOR CHICKEN AND THE LIKE

Filed Feb. 21, 1966

Ellen Harnest

United States Patent Office 3,392,665
Patented July 16, 1968

3,392,665
ROASTING SUPPORT FOR CHICKEN
AND THE LIKE
Ellen Harnest, 313 Colonia St., Chateauguay,
Quebec, Canada
Filed Feb. 21, 1966, Ser. No. 529,068
1 Claim. (Cl. 99—426)

ABSTRACT OF THE DISCLOSURE

This invention consists in a roasting support for chicken and the like birds, comprising a bulbous shaped head member adapted to be inserted within the inner cavity of a disembowelled chicken, or the like bird, and a leg member secured to said bulbous shaped member and adapted to protrude outwardly from the bird to support the head member in upright position, whereby the bird is supported above a supporting surface and all of its skin surface is exposed to the source of heat. Thus, there is no localized overheating of the skin and no piercing of the skin.

---

The present invention relates to roasting of chickens and the like fowl or birds.

Pointed support members are generally inserted into the flesh of the chicken, or the like bird, for firmly supporting the same during roasting. At least some of the juices are thereby lost and the appearance of the roasted chicken is somewhat marred. If the chicken is simply deposited in a tray, or supported on spaced rods, some of its external surface will not become roasted to the same uniformity as the rest of the bird surface.

Accordingly, the general object of the present invention resides in the provision of a support for supporting a chicken, or the like bird, during roasting, so arranged that the entire skin surface of the bird will be exposed to the source of heat, the bird being supported from the inside thereof and such that all its skin is well above any hot support surface. Thus, there is no localized overheating of the skin and no piercing of said skin.

Another object of the present invention resides in the provision of a roasting support of the character described, which can be easily collapsed to take up a minimum of room when not in use.

The foregoing and other important objects of the present invention will become more apparent during the following disclosure and by referring to the drawings, in which.

Figure 1:
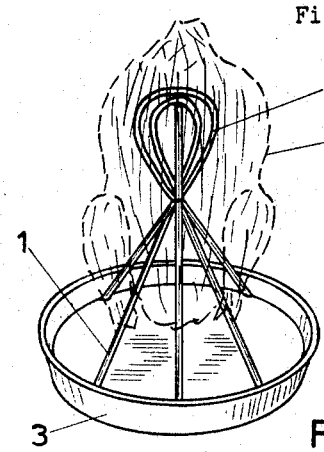
FIGURE 1 is a perspective view of a first embodiment of the roasting support in accordance with the invention.

The support of FIGURE 1 comprises a plurality of substantially rigid bent wires disposed in substantially equally inclined planes of form a bulbous shaped head member 2 and substantially straight and flaring leg members 1. These wires are secured together at two spaced points, namely: at the top center portion of the head member and at the restricted zone forming the connection of the leg members 1 with the bulbous head member 2.

Thus, member 2 provides generally curved external surfaces, free of any asperities and is supported in upright position by legs 1. Legs 1 in turn rest on any supporting surface, such as a cookie tray 3 or the like.

The member 2 and at least part of the legs 1 are adapted to engage the inside cavity of a disemboweled chicken, or the like bird 4, to be roasted with the legs 1 protruding outwardly from the bird 4. The member 2 is in contact with the inside cavity of the bird and supports the latter well above the cookie tray 3, or other supporting surface.

The bird is totally supported from the inside thereof so that its entire skin can be exposed to a source of heat.

The supporting surface, such as cooking tray 3, may be rotatable if desired, in case the source of heat is restricted to heat only part of the bird at one time.

The wire elements constituting the legs 1 and member 2 can be coated with a heat-resistant synthetic resin, such as the resin known under the trademark Teflon, owned by Du Pont, or the resin sold by General Electric, under the trade name polycarbonate.

FIGURES 2, 3, 4, 5, and 6 shows a second embodiment of the roasting support, said roasting support being collapsible for storing in a minimum of space. In this embodiment, there are two or more substantially rigid wire elements 5, each bent into a U with the intermediate portions of the arms of the U close to each other.

Figure 5:
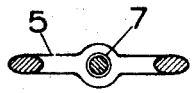
FIGURE 5 is a partial section taken along line 5—5 of FIGURE 2.

The portions of the arms in proximity with each other are surrounded by a loose ring 6 and the bight portion of each wire is somewhat flattened and perforated, as shown at 7 in FIGURE 5, and pivotally interconnected by a rivet 8 or the like.

Figure 2:
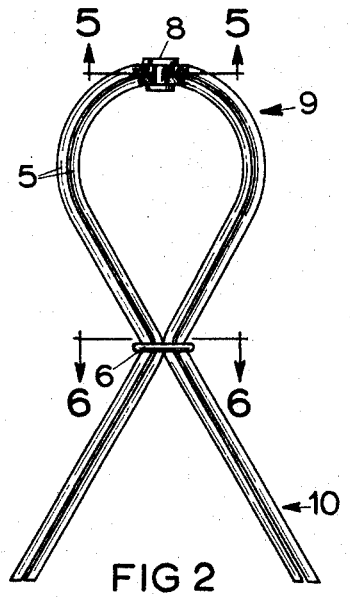
FIGURE 2 is a side elevation of a second embodiment of the roasting support in collapsed condition.
Figure 3:
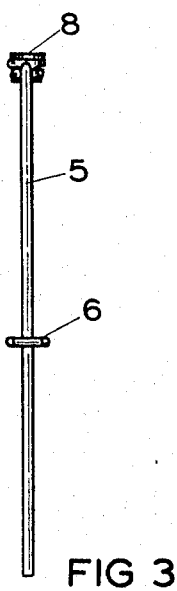
FIGURE 3 is an end view of the collapsed support of FIGURE 2.
Figure 6:
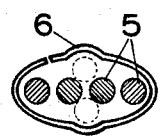
FIGURE 6 is a cross-section taken along line 6—6 of FIGURE 2.
Figure 4:
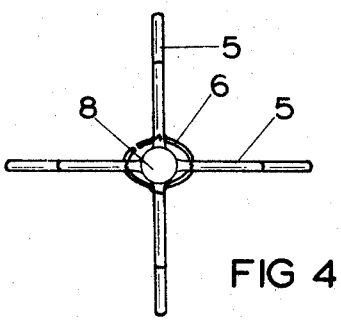
FIGURE 4 is a top plan view of the support of FIGURE 2 in erected operative position.

The two or more wires are bent into slightly decreasing sizes so as to nest one within the other in a common plane in the collapsed position of the device, as shown in FIGURES 2 and 3. The wires can be turned one relative to the others about rivet 8 and ring 6 to erect the device, as shown in FIGURE 4.

In the erected position, the portions of the wires above ring 6 form a chicken-engaging head member 9 similar to member 2 of the first embodiment, free of any asperity and having a bulbous shape presenting outer curved surfaces to contact the inner surface of the chicken cavity, while the portions of the wires below ring 6 flare outwardly and form supporting legs 10 for the bulbous member 9.

The wires 5 may be covered with a heat-resistant synthetic resin as in the first embodiment.

Figure 7:
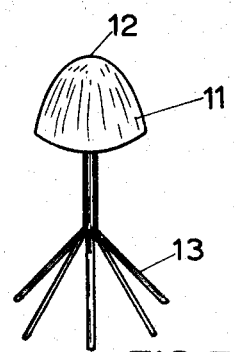
FIGURE 7 is a perspective view of still another embodiment of the roasting support in accordance with the invention.

FIGURE 7 shows a third embodiment of the invention in which the chicken-engaging member is in the shape of a cone 11, but with a rounded apex 12, said cone providing a continuous surface and supported by wires 13 forming outwardly bent legs and making substantially equal angles between each other. Here again the member 11 is adapted to contact the surface of the inside cavity of a disemboweled chicken, or the like bird, and the legs 13 protrude from the supported chicken to support the latter in spaced relationship above the supporting surface. Cone 11 may be covered with a layer of heat-resistant synthetic resin.

While preferred embodiments in accordance with the invention have been illustrated and described, it is understood that various modifications may be resorted to without departing from the scope of the appended claim.

What I claim is:

1. A roasting support for chicken and the like birds, comprising a plurality of similarly shaped rigid wire elements, each bent into a U with the intermediate portions of the arms of the U close to each other to form a restricted zone, the portion above the restricted zone forming a loop and the portions of the arms below the restricted zone being substantially straight and flaring outwardly, the top center portion of the loops of said wire elements crossing one another, said wire being pivotally connected one to the other in said restricted zone and in the top center portions of the loops, such that said wire elements may be folded to take a collapsed position and may be disposed in mutually inclined planes so that said loop portions form a bulbous shaped head member and said flaring portions form outwardly downwardly flaring leg members adapted to support said bulbous shaped member in upright position, said bulbous shaped member adapted to engage within and contact the surface of the inner cavity of a disembowelled chicken and the like bird with said leg members protruding outwardly from said chicken and the like bird to support the latter spaced above a supporting surface.

References Cited

UNITED STATES PATENTS

| | | | |
|---|---|---|---|
| 931,088 | 9/1909 | Roberts | 99—442 |
| 1,565,077 | 12/1925 | Finn | 99—442 |
| 2,648,275 | 8/1953 | Thompson | 99—419 |
| 2,821,904 | 2/1958 | Arcabosso | 99—346 |
| 2,835,480 | 5/1958 | Perez | 99—419 X |
| 3,273,489 | 9/1966 | Wilson | 99—421 |
| D. 125,621 | 3/1941 | Hewitt. | |

WALTER A. SCHEEL, *Primary Examiner.*

BILLY J. WILHITE, WILLIAM I. PRICE, *Examiners.*

A. O. HENDERSON, *Assistant Examiner.*